United States Patent
Ryan et al.

(10) Patent No.: US 7,907,727 B2
(45) Date of Patent: Mar. 15, 2011

(54) SYSTEM AND METHOD FOR ALLOWING COPYING OR DISTRIBUTION OF A COPY PROTECTED SIGNAL

(75) Inventors: John O. Ryan, Woodside, CA (US); Ronald Quan, Cupertino, CA (US)

(73) Assignee: Rovi Solutions Corporation, Santa Clara, CA (US)

( * ) Notice: Subject to any disclaimer, the term of this patent is extended or adjusted under 35 U.S.C. 154(b) by 1017 days.

(21) Appl. No.: 11/228,757

(22) Filed: Sep. 16, 2005

(65) Prior Publication Data

US 2006/0083373 A1    Apr. 20, 2006

Related U.S. Application Data

(63) Continuation-in-part of application No. 10/968,487, filed on Oct. 19, 2004, now Pat. No. 7,784,103.

(51) Int. Cl.
 *H04N 7/167* (2006.01)
(52) U.S. Cl. .................................. 380/203; 380/201
(58) Field of Classification Search .................. None
 See application file for complete search history.

(56) References Cited

U.S. PATENT DOCUMENTS

| | | | |
|---|---|---|---|
| 4,631,603 A | 12/1986 | Ryan | |
| 4,914,694 A | 4/1990 | Leonard et al. | |
| 5,194,965 A * | 3/1993 | Quan et al. | 386/94 |
| 5,315,448 A * | 5/1994 | Ryan | 360/60 |
| 5,574,787 A | 11/1996 | Ryan | |
| 5,799,081 A | 8/1998 | Kim et al. | |
| 5,953,417 A * | 9/1999 | Quan | 380/203 |
| 6,381,747 B1 | 4/2002 | Wonfor et al. | |
| 6,404,889 B1 | 6/2002 | Ryan et al. | |
| 6,523,113 B1 | 2/2003 | Wehrenberg | |
| 6,836,549 B1 | 12/2004 | Quan et al. | |
| 6,980,653 B1 | 12/2005 | Sako et al. | |
| 7,050,698 B1 | 5/2006 | Quan | |
| 7,784,103 B2 | 8/2010 | Ryan et al. | |
| 2004/0054894 A1 | 3/2004 | Lambert | |
| 2004/0062527 A1 | 4/2004 | Kuroda | |
| 2004/0179691 A1 | 9/2004 | Hori et al. | |
| 2006/0085863 A1 | 4/2006 | Ryan et al. | |
| 2006/0110131 A1 | 5/2006 | Okauchi et al. | |
| 2008/0292269 A1 | 11/2008 | Ryan et al. | |

FOREIGN PATENT DOCUMENTS

EP    0735752 A2    10/1996

(Continued)

OTHER PUBLICATIONS

"U.S. Appl. No. 10/968,487, Final Office Action mailed on Nov. 26, 2008", 11 pgs.

(Continued)

*Primary Examiner* — Kaveh Abrishamkar
(74) *Attorney, Agent, or Firm* — Schwegman, Lundberg & Woessner, P.A.

(57) ABSTRACT

A copy protection system and method for allowing copying or distribution of a copy protected signal is disclosed. One embodiment includes an apparatus and method for receiving a media signal in which a copy protection signal is embedded, receiving a control signal, generating a modified media signal by modifying or blanking at least a portion of the copy protection signal, if the control signal is configured to enable modification or blanking of the copy protection signal, and outputting the modified media signal.

47 Claims, 5 Drawing Sheets

FOREIGN PATENT DOCUMENTS

| | | |
|---|---|---|
| EP | 0969462 A1 | 1/2000 |
| EP | 1298655 A2 | 4/2003 |
| JP | 2004-007452 | 1/2004 |
| TW | 591651 | 6/2004 |
| TW | 222561 | 10/2004 |
| WO | WO-9743853 A1 | 11/1997 |
| WO | WO-2004081719 A2 | 9/2004 |
| WO | WO-2005073967 A1 | 8/2005 |

OTHER PUBLICATIONS

"U.S. Appl. No. 10/968,487, Non-Final Office Action mailed Jan. 9, 2007", 10 pgs.

"U.S. Appl. No. 10/968,487, Non-Final Office Action mailed May 5, 2009", 8 pgs.

"U.S. Appl. No. 10/968,487, Non-Final Office Action mailed Nov. 26, 2007", 10 pgs.

"U.S. Appl. No. 10/968,487, Response filed Feb. 14, 2008 to Non-Final Office Action mailed Nov. 26, 2007", 17 pgs.

"U.S. Appl. No. 10/968,487, Response filed May 9, 2007 to Non-Final Office Action mailed Jan. 9, 2007", 15 pgs.

"U.S. Appl. No. 10/968,487, Response filed Aug. 20, 2008 to Restriction Requirement mailed Jul. 24, 2008", 13 pgs.

"U.S. Appl. No. 10/968,487, Response filed Aug. 24, 2007 to Restriction Requirement mailed Jul. 27, 2007", 10 pgs.

"U.S. Appl. No. 10/968,487, Response filed Feb. 26, 2009 to Final Office Action mailed Nov. 26, 2008", 18 pgs.

"U.S. Appl. No. 10/968,487, Restriction Requirement mailed Jul. 24, 2008", 7 pgs.

"U.S. Appl. No. 10/968,487, Restriction Requirement Mailed Jul. 27, 2007", 6 pgs.

"U.S. Appl. No. 12/187,191, Preliminary Amendment mailed Sep. 9, 2008", 12 pgs.

"European Application Serial No. 05812506.3, Examination Report mailed Mar. 10, 2009", 19 pgs.

"Taiwanese Application Serial No. 094136598, Office Action mailed Apr. 26, 2007", 7 pgs.

"U.S. Appl. No. 10/968,487, Response filed Jul. 9, 2009 to Non Final Office Action mailed May 5, 2009", 14 pgs.

"European Application Serial No. 05812506.3, Office Action mailed Jun. 15, 2009", 8 pgs.

"U.S. Appl. No. 10/968,487, Final Office Action mailed Nov. 24, 2009", 8 pgs.

"U.S. Appl. No. 10/968,487, Response filed Mar. 24, 2010 to Final Office Action mailed Nov. 24, 2009", 14 pgs.

"European Applicaion Serial No. 05812506.3, Office Action mailed Dec. 9, 2009", 4 pgs.

"U.S. Appl. No. 10/968,487 Notice of Allowance mailed Apr. 23, 2010", 11 pgs.

"Taiwan Application Serial No. 095134143, Office Action mailed Jul. 14, 2010", 5 pages.

"U.S. Appl. No. 10/968,487, Examiner Interview Summary mailed Apr. 23, 2010", 2 pgs.

"U.S. Appl. No. 12/187,191, Response filed Dec. 17, 2010 to Restriction Requirement mailed Nov. 24, 2010", 11 pgs.

"U.S. Appl. No. 12/187,191, Restriction Requirement mailed Nov. 24, 2010", 6 pgs.

"European Application Serial No. 06803548.4, Extended European Search Report mailed Dec. 6, 2010", 11 pgs.

Bloom, J. A, et al., "Copy Protection for DVD Video", Proceedings of the IEEE, vol. 87, No. 7, (Jul. 1999), pp. 1267-1276.

\* cited by examiner

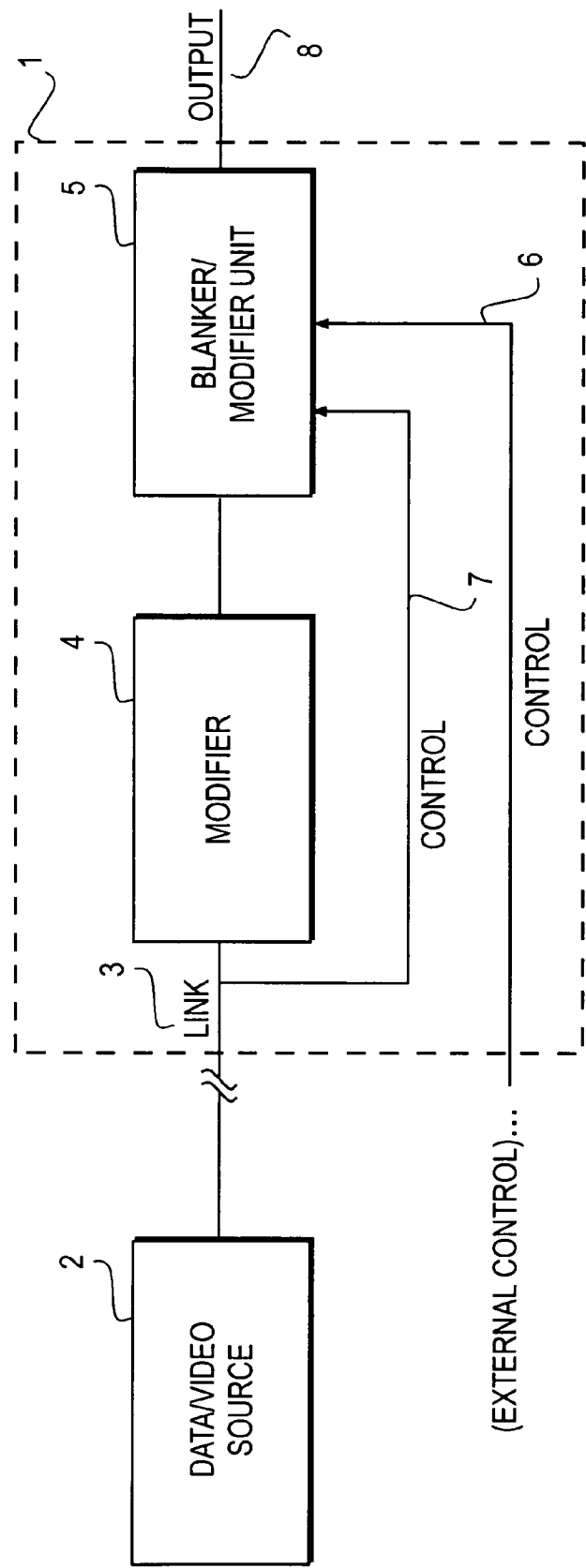

US 7,907,727 B2

SYSTEM AND METHOD FOR ALLOWING COPYING OR DISTRIBUTION OF A COPY PROTECTED SIGNAL

This application is a continuation-in-part of U.S. Ser. No. 10/968,487 filed Oct. 19, 2004 now U.S. Pat. No. 7,784,103.

BACKGROUND

1. Field of the Invention

This invention is related to content control systems or copy protection signals.

2. Related Art

Currently, a video or media device such as a DVD player may contain trigger bits to activate at least one of many conventional types of copy protection signals, copy inhibit signals, or data signals used for content control. These trigger bits are encoded or inserted in the DVD disk, which then commands a circuit in the DVD player to appropriately apply at least part of the copy protection signal or data signal to its media/video output. Depending on the trigger bits' value, a level of copy protection is added to the video output of the DVD. However, it may desirable for rights owners, such as movie studios, to insist that copy protection or copy inhibit signals are on (i.e. trigger bits are set) all the time unless otherwise authorized. It should be noted that one would still be able to play back the media, but not make a copy of it. For example, if a library or the like is concerned that media can be easily copied, the library can distribute all media with copy protection signals or copy inhibit data signals active such that the borrower may not make a copy without authorization. Such authorization may require the borrower to communicate to the library to retrieve an access code or authorized command for the media/video player to turn off the copy protection signals or copy inhibit signals. Thus, in some circumstances, it is necessary to have the flexibility to disable a copy protection signal or copy inhibit data signal that has been triggered active by default. Existing copy protection systems do not provide this level of flexibility.

BRIEF DESCRIPTION OF DRAWINGS

The present invention is illustrated by way of example and not limitation in the figures of the accompanying drawings, in which FIG. 1A illustrates in general an embodiment of the invention wherein the data or video source is coupled to a first modifier (e.g., copy protection signal and/or content control signal processor.)

DETAILED DESCRIPTION

Figure 1B:
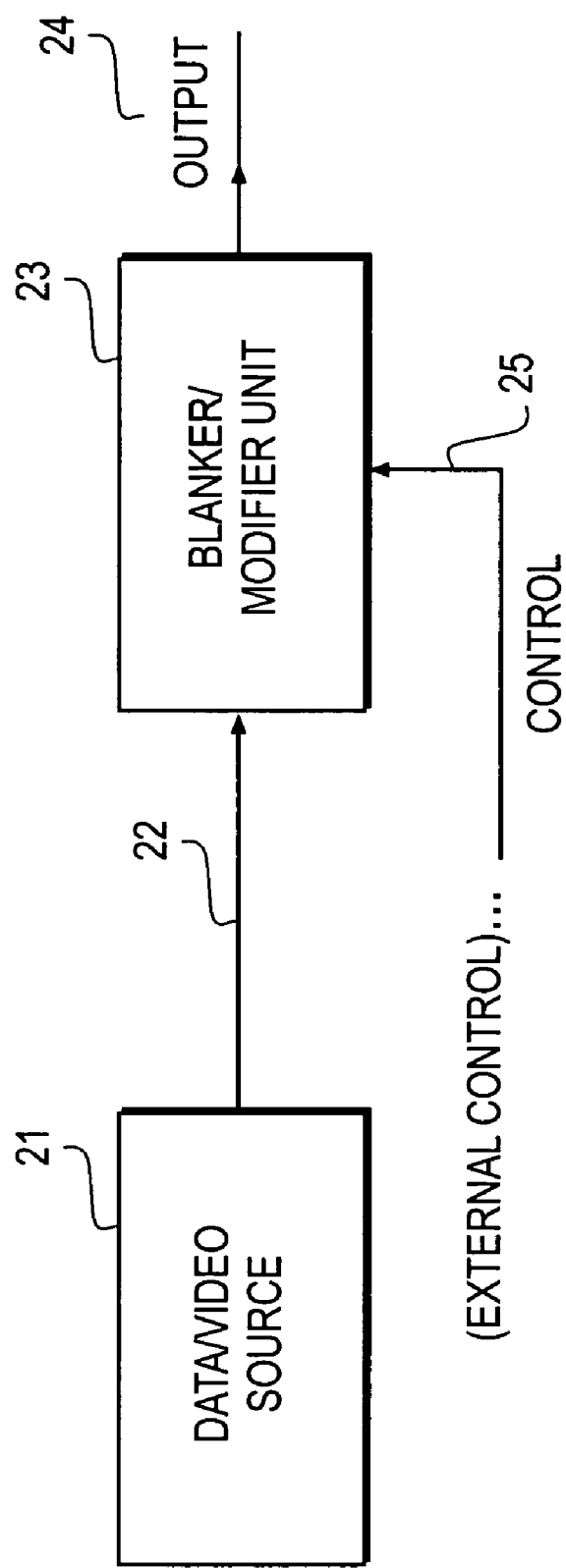
FIG. 1B illustrates another embodiment of the invention wherein the data or video source already contains a copy protection signal and/or content control signal.

A copy protection system and method for allowing copying or distribution of a copy protected signal is disclosed. In the following detailed description, numerous specific details are set forth in order to provide a thorough understanding of the present invention. However, it will be apparent to one of ordinary skill in the art that these specific details need not be used to practice the present invention. In other circumstances, well-known structures, circuits, processes and interfaces have not been shown or described in detail in order not to unnecessarily obscure the present invention.

In one embodiment of the invention, a copy protection signal or part thereof, or a copy inhibit signal is set as a default output condition with media such as a video signal. To reduce the copy protection effectiveness or to allow copying or distribution, blanking bits or the like are required. An example of the blanking bits or authorization bits may be a digital and/or an analog signal applied to the media player or the recorded media. As used herein, blanking or modification bits can be implemented as one or more bits used to signal the elimination or modification of a copy protection and/or content control signal.

In an example for DVD media, a new type of DVD player may contain a blanking or muting circuit, which removes or reduces an effect of the copy protection signal or copy inhibit data signal (either of these signals may be construed as a content control signal). This blanking or muting circuit may receive a command via information on the DVD or from an external source to, for example, allow copying or distribution.

The external source may be a local or remote signal source that provides a signal to allow authorization to modify the content control signal or the copy protection. For example, a particular alphanumeric and/or numeric sequence may be entered via the front panel or remote control of the DVD player to allow the DVD player to output a signal, which allows authorized copying or distributing. In another embodiment, the DVD player may have an external signal input, such as a data line input, to receive the authorized information to modify the content control bit(s). Such a data line input includes a wired or wireless network connection, telephone line connection, Ethernet connection, and/or the like. In another embodiment, the external signal source may provide signals, such as a blanking bit or blanking bits, that may be transmitted optically, electronically, sonically, or otherwise via a remote control or transmitter.

One further example of one embodiment is that the authorization code to the DVD player may be time-limited or play-limited. For example, the DVD player may only be authorized to turn off a copy protection signal or a content control signal for the duration of one movie interval. After that, the content control signals turn back on (i.e. the suppression of the content control signals is deactivated). For example, if the movie is played a second time, the copy protection signal and/or content control signal is turned back on (i.e. the suppression of the content control signals is deactivated). Alternatively, keystrokes and/or operational functions are monitored in the DVD such that when a movie is played fully, a copy protection signal and/or content control signal that was suppressed is turned back on.

To summarize, in various embodiments of the present invention, the copy protection (or content control) signal is typically permanently enabled so that the DVD player (which may include an existing DVD player) will output a copy protection or content control signal by default. One embodiment of the present invention includes a blanking (or modifying) circuit, which may reside in the DVD player (or in a media player) and which is activated via control signals on the disk or via a blanking signal. When activated, the blanking circuit authorizes recording of the DVD content by turning off any or all of the copy protection (or content control) signal(s). The blanking signal may be provided from an external source, such as the Internet or any other type of external source or communication medium, such as a remote control device, player keypad, voice activation, telephone line, wired or wireless data lines, electrical or sonic transmission, or the like.

In another embodiment of the present invention, the embodiment builds upon an implementation disclosed in a U.S. patent application entitled, "A Method and Apparatus for Storing Copy Protection Information Separately from Protected Content", filed Oct. 19, 2004, assigned to the same assignee as the present invention, and assigned U.S. Ser. No. 10/968,487. The referenced U.S. patent application states in its specification, "In one embodiment, the file 109 is a digitized analog copy protection waveform that can be conveniently added to a digital content file 107." It is an object of the present invention to expand on this previously disclosed invention in that a content control signal or copy protection signal is carried throughout the analog and/or digital domains. Such a content control signal or copy protection signal has the advantage of being an easily changeable or updateable waveform, which can optimize playability and/or effectiveness on, for example, a display device and/or a recorder. This is distinguished from the conventional implementation of copy protection in a DVD or Set Top box, wherein a fixed copy protection process is stored in the player or box.

In another embodiment, it is possible to deploy a compression (and/or an analog to digital converter) method on the video signal which allows digitizing video signal levels below a blanking level. This way, copy protection signals that include pseudo sync or sync like signals may be carried from the analog and digital domains. With the copy protection signals originating in an analog or digital form, a DVD player does not necessarily require a copy protection generator, and the copy protection signal may be changed at a duplication house or the like for more optimal effectiveness and/or playability.

In another embodiment, copying is allowed by providing a blanking or modifying circuit (or equivalent) within the media player (e.g., DVD player, set top box, video on demand, or the like). This blanking or modifying circuit and process essentially enables the reduction of at least some effectiveness of the content control signal or copy protection signal, for example, so as to allow for copying or distributing. This modifying (blanking) method or apparatus may work in the analog, digital, and/or software domain. Modifying may include replacing/adding/inserting a waveform or voltage signal to at least a portion of the (copy protected or content control) video/data signal.

In another embodiment, a data or video signal contains at least part of a copy protection signal or a content control signal. Authorization for copying or distributing the data or video signal is provided via a modification circuit or method. This modification circuit or method includes a blanking or modification circuit. Control of the modification circuit or method is done via modifying or blanking bit or bits.

In another embodiment, a data or video signal coupled to a content control or copy protection signal generator is further coupled to a blanking or modifying circuit. Normally, the blanking or modifying circuit is off. When the blanking or modifying circuit is off, the content control or copy protection signal generator is active to combine a content control or copy protection signal with the data or video signal. The blanking or modifying circuit can be activated via blanking or modifying information to cause the modification of at least a part of the content control or copy protection signal. Alternatively, the blanking or modifying circuit can be activated via blanking or modifying information to cause the content control or copy protection signal generator to be deactivated. The modification or suppression of the content control or copy protection signal enables the creation or distribution of a more recordable copy of the data or video signal or allows recording, distribution, or viewing thereof. For example, the data or video signal may come from any combination of a DVD or CD disk, a FireWire connection, a digital connection, an analog connection, a USB connection, a WiFi connection, or Internet Connection, wireless connection, radio or TV transmission, a set top box, or a storage medium including a hard disk, tape, optical media, and/or solid state memory. The copy protection signal may include, but is not limited to, a modification to selected sync signals or pulses, modification to blanking intervals with selected level or levels of positive and/or negative waveforms/pulses, modification to selected active video portions with selected level or levels of positive and/or negative waveforms/pulses, modification to selected portions of the video signal with selected level or levels of positive and/or negative waveforms/pulses, and/or selected addition of sync-like signals to a portion of the video signal. A copy protection signal may include those signals, which, in general, display a satisfactory picture, but deliver a lesser quality picture upon recording and playback. A copy protection signal may include a signal that causes an erroneous scan or distorted display when played back. The copy protection signal may also include, but is not limited to, a modification to selected lines to induce color distortion on a display upon playback. For example, color burst cycle modifications are provided in selected horizontal blanking intervals. Alternatively, adding at least one waveform or selected voltage level to at least a portion of selected horizontal blanking intervals of a component color channel or channels is a form of copy protection.

FIG. 1A shows a data or video signal source 2, which is coupled via link 3 to modifier 4. The data or video signal source 2 may be of digital form or alternatively in analog form. For example, if data or video signal source 2 is comprised of digital signals, these signals may come from a storage device, receiver, or transmission link such as fiber, wireless, or the like. If data or video signal source 2 is an analog source, for example, the signal may be a video signal of any of the various conventional TV standards, composite and/or component.

Modifier 4 may be an apparatus that inserts or adds a copy protection signal and/or content control signal to the signal source 2. Modifier 4 can be a (conventional) device for inserting copy protection or copy control signals into a data or video signal from signal source 2. Such devices may include one or more analog/anti copy (protection) or anti-copy processor (ACP) devices, one or more copy protection (CP) signal devices, and or one or more content control signal generators. An example of ACP (which may include at least part of a copy protection signal in the digital, analog, and or software domain) may comprise a signal modifier. This signal modifier may add or insert a waveform or signal to the data/video source, or it may modify the data/video source such as by combining any added pulses, any added copy protection signal enhancers, and or any sync modifications such as narrowing/widening or amplitude variation. ACP may include other types of copy protection processes such as those modifications related to the luma and or chroma channel. Alternatively, ACP may include a change in format structure such as lines per field or frame. So ACP is not limited to an analog copy protection process or to a copy protection process that adds or inserts a signal (e.g., alternatively, ACP may utilize deleting or attenuating or transforming at least part of the data/video source). ACP may comprise a process/modification of the data/video source that for example causes a recorder to playback a signal that causes a deviation in brightness and or stability when displayed. In any of the previously (or subsequently) mentioned ACP devices, an ACP signal or waveform may be provided by an ACP device. An example of the content control signal may be a conventional CGMS signal or a data signal or some modification to the data or video signal. Modifier 4 may be linked to a communications channel to enable the selective alteration of the copy protection signal or content control signal as required. One example of the modifier 4 is a device that adds any combination of positive and/or negative pulses (waveform or waveforms) of selected levels to a portion of the data or video signal from signal source 2. For example, added positive pulses may be automatic gain control (AGC) pulses, or the like. Alternatively, if negative pulses are added, these pulses may resemble a waveform or pulse whose level is below blanking level (or a level below blanking level, but a level higher than a sync tip level) or whose level is around a sync tip level. Modifier 4 (or ACP) is not limited to the examples above; for example, digital signals or software commands can be part of a copy protection and or content control signal. In another example, Modifier 4 (or ACP) may comprise of a signal modification device that may scale pixels in one or more directions (e.g., for content control). For example, (an amount of) warping or scaling of an image or a signal can comprise part of a content control system (e.g., as a way to convey information or command). (Modifier 5 then can offset a part of or all of the warping or scaling depending on its control signal as to set or define the amount/extent of content control.)

In general, modifier 4 is activated so that the general state of the output signal 8 includes a copy protection signal and/or content control signal. In one embodiment of the present invention, modifier 4 is coupled to blanking or modifying unit (blanker/modifier unit) 5. As described herein, blanker/modifier unit 5 is provided to modify or suppress the copy protection or content control signal inserted into the data or video signal from signal source 2 by modifier 4.

Blanker/modifier unit 5 includes functional structure and methods to change the copy protection and/or content control signal. For example, blanker/modifier unit 5 may replace an added or inserted waveform with a waveform at a different level or a different waveform. In one example, the added/inserted waveform is a positive AGC pulse. Blanker/modifier unit 5 may blank out any portion of selected AGC pulses or the blanker/modifier unit 5 may narrow, level shift, time shift, and/or time compress an AGC pulse; or blanker/modifier unit 5 may add another waveform to an AGC pulse. Such modifications described herein may be applied to any portion of the copy protection and/or content control signal.

Blanker/modifier unit 5 may also insert more normal sync pulses and/or horizontal/vertical blanking intervals into the data or video signal. For example, the copy protection signal may include a raised and/or lowered portion or portions of a back porch region, and/or modified sync pulses (e.g., sync narrowing or widening or amplitude level shifts). To reduce an effect of the example copy protection signal, the blanker/modifier unit 5 may alter at least a portion of the back porch region or alter at least a portion of selected sync pulses.

Blanker/modifier unit 5 may also be a blanking circuit, which blanks out, suppresses, or replaces a portion of the data or video signal. For example, a selected number of AGC pulses and/or pseudo sync pulses may be blanked (e.g., as to allow for a recordable copy).

As shown in FIG. 1A, the control signals 6 and 7 provided as inputs into blanker/modifier unit 5 may come from the actual signal stream, link 3 (e.g., control 7), which can "authorize" any level of modification of the copy protection and/or content control signal. Alternatively, blanker/modifier unit 5 may be controlled from an outside source (e.g., from an external signal source, such as wired or wireless network connection, telephone line connection, Ethernet connection, via a remote control or transmitter or other optical, electronic, or sonic signaling means). Control 6 or control 7 can be used to selectively command the blanker/modifier unit 5 to modify or suppress the copy protection signal and/or content control signal provided as output signal 8. It should be noted that control 6 or control 7 may contain "blanking bits" (or modification bits), for example.

Another variation of the embodiment shown in FIG. 1A is when the video signal 3 is analog. In this case, the modifier 4 may contain an analog video processor to insert or add at least one waveform to produce a copy protection signal and/or an enhancement to a basic copy protection signal. Blanker/modifier unit 5 then may be an analog "black box" in that at least a portion of the analog video copy protection signal or content control signal is modified. For example, the modification may include, but is not limited to, blanking, level shifting, sync pulse modification, modifying at least a portion of a vertical and/or horizontal blanking interval, and/or adding a waveform to a portion of the video signal. An analog black box or blanker/modifier unit 5 may include functional structure for narrowing and/or repositioning a portion of the analog video signal or regenerating one or more selected signals in the horizontal blanking interval such as selected color burst signals or selected sync pulses.

In FIG. 1A, the data or video (media) source 2 may be configured in part of a system that contains block 1 (block 1 is identified in FIG. 1A with dashed lines). In one example, data or video source 2 may be a media player or receiver combined with the functionality of block 1, which includes the functionality of modifier 4 and blanker/modifier unit 5.

FIG. 1B shows an embodiment essentially similar to the embodiment shown in FIG. 1A; but in this case, the data/video source 21 has already integrated or combined the video/data (media) signal with a copy protection and/or content control signal. As shown in FIG. 1B, data/video source 21 may include those features described above for data/video source 2 and/or modifier 4 as shown in FIG. 1A and described above. The combined video/data signal and copy protection and/or content control signal is provided by data/video source 21 as signal 22. Source 21 is coupled via signal 22 to blanker/modifier unit 23. Blanker/modifier unit 23 of FIG. 1B may include the features described above for blanker/modifier unit 5 of FIG. 1A. Blanker/modifier unit 23 may be configured to receive a control signal 25, which can be an external input similar to control signal 6 illustrated in FIG. 1A and described above. Further, because blanker/modifier unit 23 is coupled to signal 22, blanker/modifier unit 23 can be configured to receive modification bits or blanking bits from signal 22. These modification bits or blanking bits can be used to control the operation of blanker/modifier unit 23. In particular, the blanker/modifier unit 23 can be controlled using control 25 and/or blanking bits from signal 22 to selectively modify or suppress the copy protection and/or content control signal output as signal 24. In blanker/modifier unit 5 or 23, one or more control inputs may be used to control the blanker/modifier unit.

Figure 1C:
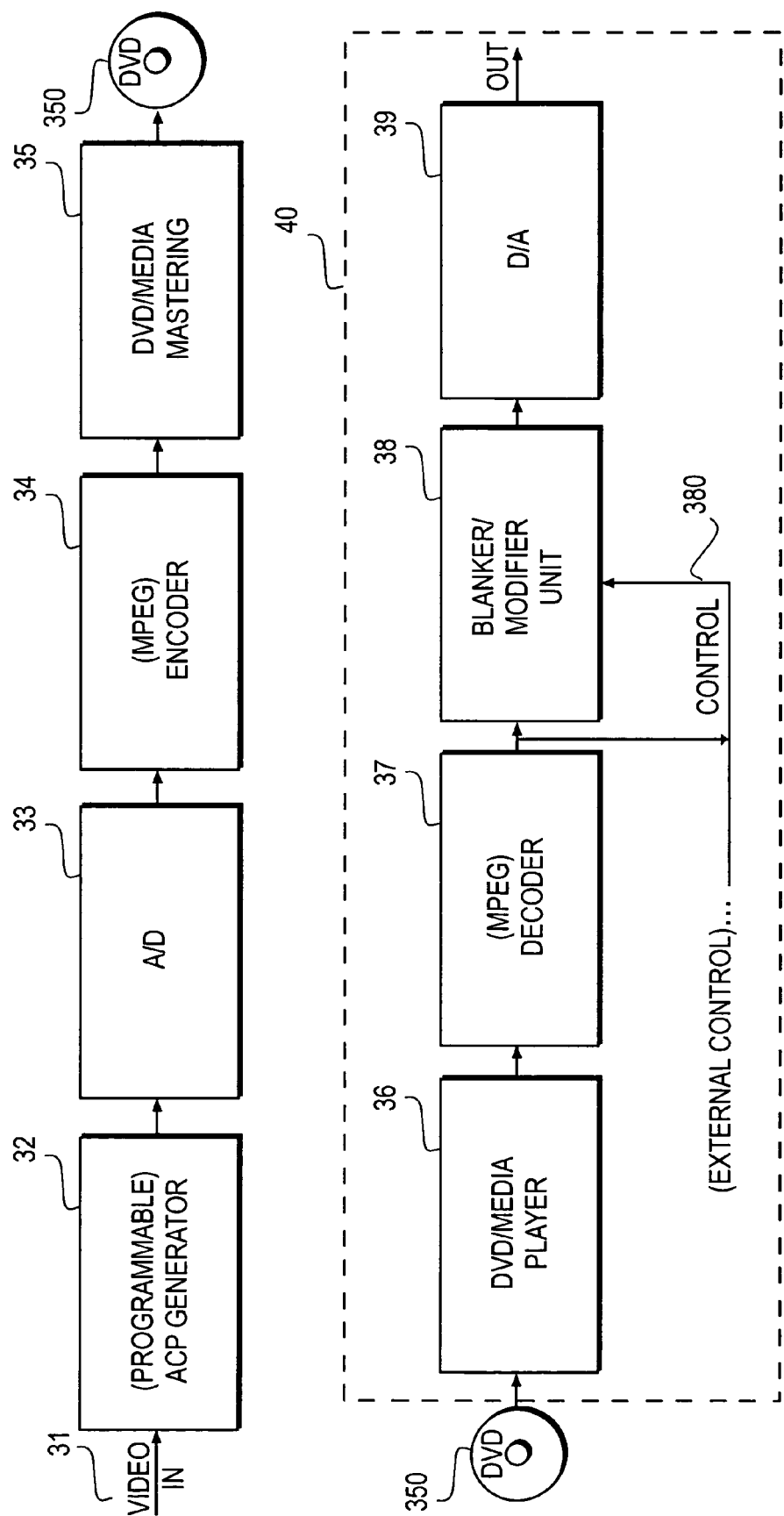
FIG. 1C illustrates an example embodiment wherein a changeable copy protection signal and/or content control signal is carried throughout the analog and digital domains, and wherein a modifier is used, for example, to alter a copy protection and/or a content control effect.

FIG. 1C shows another embodiment of the present invention wherein an analog video program source 31 is coupled to an ACP generator 32. Generator 32 then adds or inserts at least a modification to the video source 31. As previously described (e.g., in FIG. 1A or 1B), generator 32 may modify a sync pulse or signal. Generator 32 may modify a particular portion or portions of a video signal. Alternatively, generator 32 may modify a horizontal/vertical blanking interval (e.g. AGC and/or pseudo sync pulses and/or color channel modifications such as a color burst or equivalent in the component domain and/or a portion of a back porch), and/or add/insert a sync like pulse or waveform. Generator 32 may also generate a data or content control signal.

As shown in FIG. 1C, the output of generator 32 is coupled to an analog to digital (A/D) converter 33. Converter 33 is coupled to an encoder 34 (e.g., MPEG or data compression). The output of encoder 34 is coupled to a recorder or mastering device 35 to provide a recorded copy of the video program 31 combined with an embedded copy protection and/or content control signal on recorded media 350. This content-protected video program copy can be stored on various types of recordable media 350.

The recorded copy 350 can be played back via an embodiment of the present invention shown in FIG. 1C as block 40 (shown as including the functional components within the dashed lines). Block 40 contains a DVD/media player 36 coupled to a decoder 37. Decoder 37 contains the digitized version of video program 31 plus the digitized version of the copy protection and/or content control signal. The output of decoder 37 is coupled to a blanker/modifier unit 38. Blanker/modifier unit 38 may receive a control signal 380. Control signal 380 can be sourced from the output of decoder 37 or from an external source. Blanker/modifier unit 38 may be configured to receive the control signal 380, which can be similar to control 7 or similar to the external input signal 6 illustrated in FIG. 1A and described above. The output of the blanker/modifier unit 38 is coupled to a digital to analog (D/A) converter 39, which outputs an analog video signal. In one example, control 380 is generally (typically by default) turned off (inactive), which causes blanker/modifier unit 38 to be inactivated. When inactivated, blanker/modifier unit 38 retains (i.e. leaves intact) the copy protection and/or content control signal(s) provided as input to D/A converter 39. As a result, the output of converter 39 includes the analog version of the copy protection and/or content control signal(s).

If it is desired to modify or suppress the copy protection and/or content control signal(s), control 380 receives modification or blanking bits from an internal or external source to selectively command the blanker/modifier unit 38 to alter the copy protection and/or content control signal. For example, the blanking bits can be set to allow or prevent recording, or to set conditions on recording or distributing. The altered or suppressed copy protection and/or content control signal(s) is provided as input to D/A converter 39. The output of converter 39 includes the analog version of the altered or suppressed copy protection and/or content control signal(s).

Figure 1D:
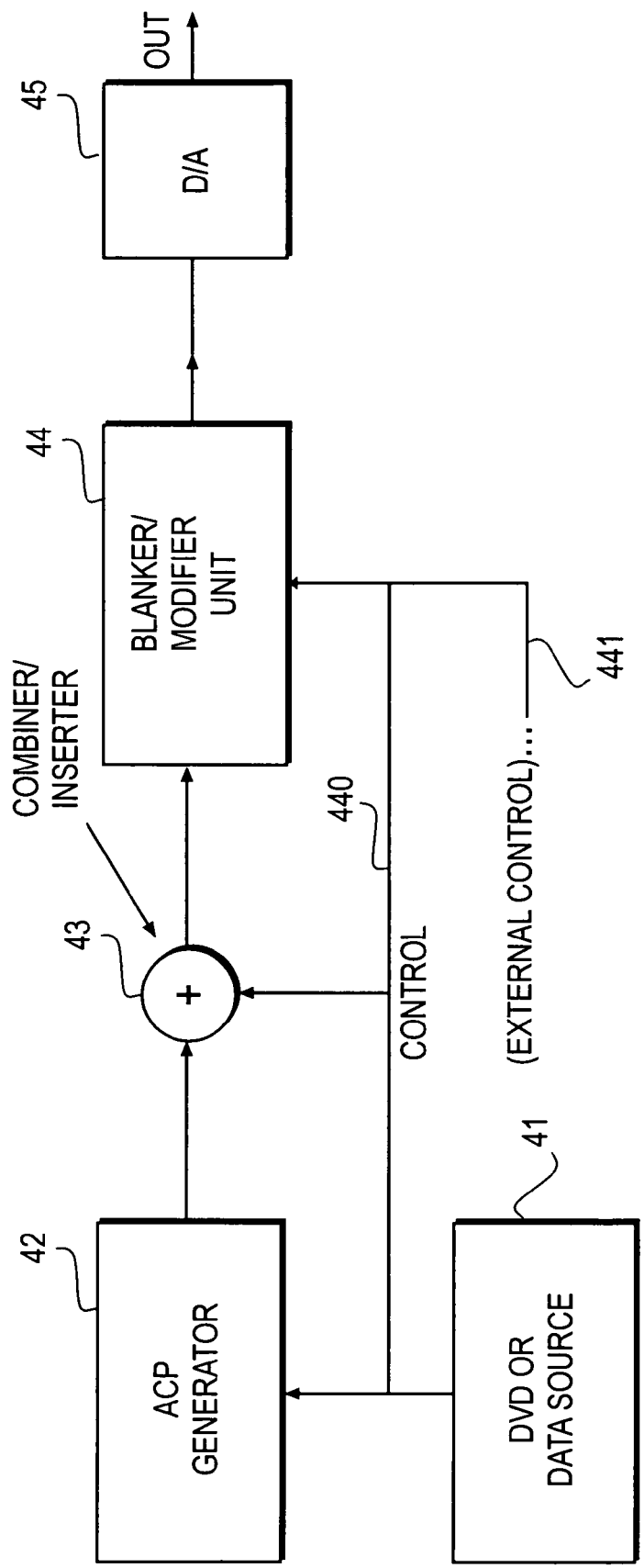
FIG. 1D illustrates an example embodiment comprising an anti-copy processor along with a combiner and modifier.

FIG. 1D illustrates another embodiment wherein a DVD or data source 41 is coupled to an anti-copy protection generator 42. The DVD or data source 41 corresponds to any of a variety of well-known devices that provide a video signal from an optical or magnetic media source, a memory device, a receiver, and or a networked data source. The output of anti-copy protection generator 42 contains at least one pulse or waveform that is combined via combiner/inserter 43 with the signal output of DVD or data source 41. The output of combiner/inserter 43 is coupled to blanker/modifier unit 44. Blanker/modifier unit 44 of FIG. 1D may include the features described above for blanker/modifier unit 5 of FIG. 1A or blanker/modifier unit 23 of FIG. 1B. The output of blanker/modifier unit 44 is then coupled to a digital to analog (D/A) converter 45. Based on control input signals and/or modification bits received from an external or internal source, blanker/modifier unit 44 can selectively cause the modification or blanking out of at least a portion of the copy protection and/or content control signal provided as input to D/A converter 45. The analog version of the modified signal is output from D/A converter 45.

Blanker/modifier unit 44 may have at least one control input as shown in FIG. 1D. Control 440 is optionally coupled to the output of DVD or data source 41 to receive "authorization" information (e.g., modification bits or blanking bits). This authorization information is used by blanker/modifier unit 44 as a control input signal to selectively cause the modification or blanking out of at least a portion of the copy protection and/or content control signal provided as input to D/A converter 45. In another embodiment, blanker/modifier unit 44 can receive a control input signal 441 from an external source (e.g., from an external signal source, such as wired or wireless network connection, telephone line connection, Ethernet connection, via a remote control or transmitter or other optical, electronic, or sonic signaling means). Control input signal 441 can also be used to receive "authorization" information (e.g., modification bits or blanking bits) from an external source. Control input signal 441 is used by blanker/modifier unit 44 as a control input signal to selectively cause the modification or blanking out of at least a portion of the copy protection and/or content control signal provided as input to D/A converter 45.

Figure 2A:
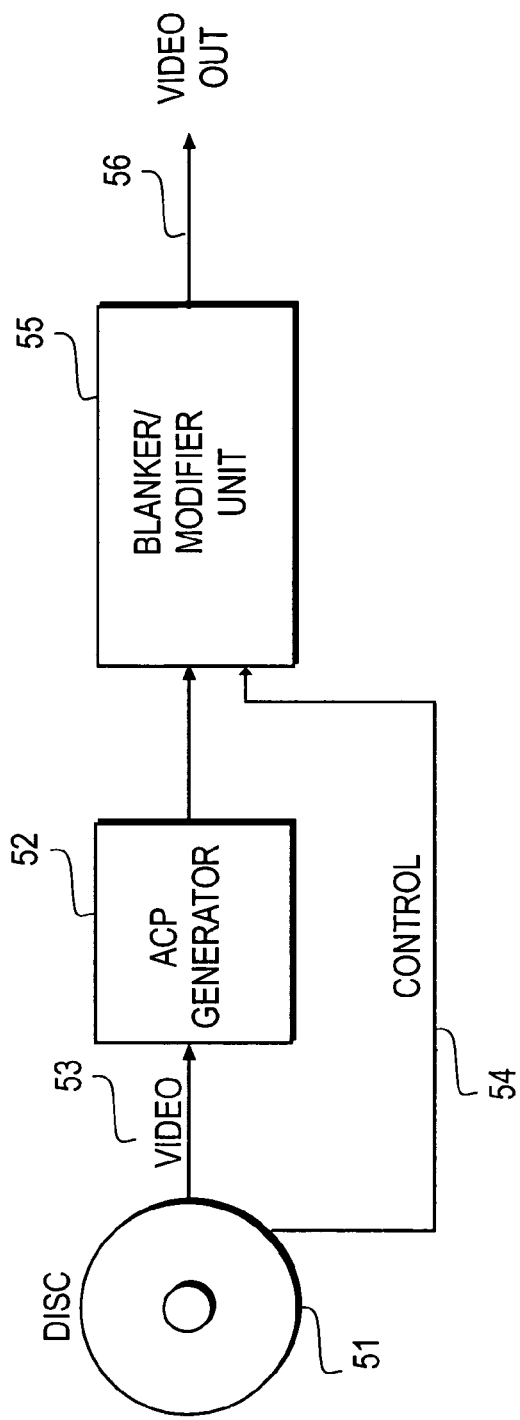
FIG. 2A shows an example embodiment comprising of a storage device (or signal stream) coupled to an anti-copy processor or inserter along with a blanker/modifier apparatus.
Figure 2B:
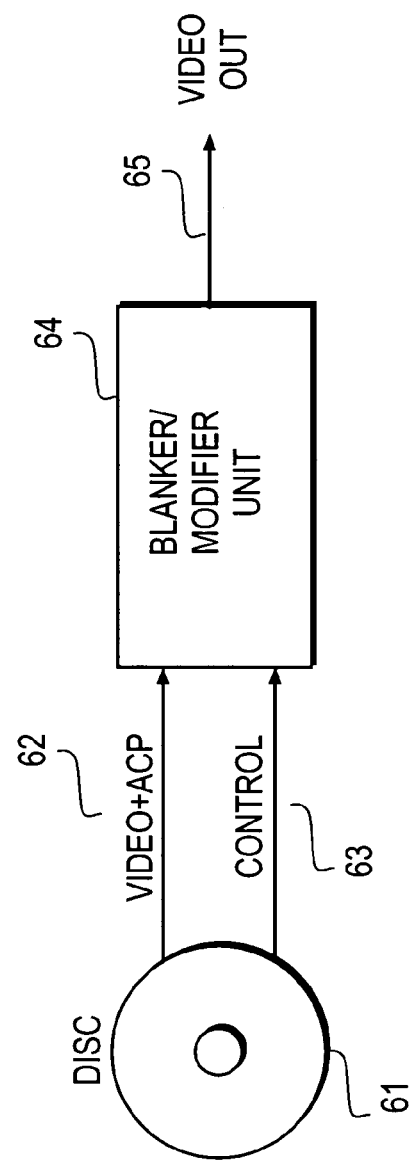
FIG. 2B shows an example comprising of a storage device (or signal stream) that contains a copy protection signal (and/or content control signal), which is then coupled to a modifying apparatus.

As shown in FIGS. 2A and 2B and described in more detail below, the ACP signal in a video signal may be always on (active) via the stored media (e.g. an optical disc) alone (FIG. 2B) or via the stored media as coupled to an ACP generator 52 (FIG. 2A). Instructions to turn off (or to modify) at least part of the ACP signal, which can include actively removing the ACP signal, can be passed through a control line to blanker/modifier unit 55 (FIG. 2A) or blanker/modifier unit 64 (FIG. 2B).

FIG. 2A shows a disc 51 (e.g., DVD or other media such as optical disc, tape, solid state memory, hard drive, etc.), which contains video information 53. Video information 53 is coupled to an ACP generator 52. ACP generator 52 generates a copy protection signal which is combined with or modifies video signal 53. The output of ACP generator 52, which contains a copy protection signal, is coupled to (provides an input to) a blanker/modifier unit 55. A control signal 54 is also provided by disc 51. This control signal 54 is coupled to an input of blanker/modifier unit 55. The output of blanker/modifier unit 55 will normally (by default) output a video signal with copy protection inserted when control bits of control signal 54 are not activated (e.g., no modification and/or no blanking). If a predetermined configuration of control bits are activated via control signal 54 (e.g., from the disc 51), at least a portion of the video and/or copy protection signal will be modified or blanked by blanker/modifier unit 55.

For example, the control bits of control signal 54 may signal the removal of all or a portion of the copy protection signal from the output of ACP generator 52. The output 56 then would allow for a recordable copy of the video signal for distribution if, for example, the control bits of control signal 54 were set to remove or modify (or remove or modify sufficiently) the copy protection signal inserted by ACP generator 52.

FIG. 2B illustrates another embodiment showing a media disc 61 (e.g., DVD or other media such as optical disc, tape, solid state memory, hard drive, etc.) that has a video signal combined with an ACP signal, denoted as signal 62 in FIG. 2B. Signal 62 is coupled to (provided as an input to) a blanker/modifier unit 64. Blanker/modifier unit 64 also receives a control signal 63 as an input. Control signal 63 causes blanker/modifier unit 64 to selectively modify or blank out at least a portion of the copy protection (ACP) signal component of signal 62. The default condition for the control signal 63 is to cause blanker/modifier unit 64 to apply no modification and/or no blanking so that the ACP signal component of signal 62 is passed to the video output 65. If a predetermined configuration of control bits are activated via control signal 63 (e.g., from the disc 61), at least a portion of the ACP signal component of signal 62 will be modified or blanked by blanker/modifier unit 64 and provided as output 65. The modified/blanked signal provided as output 65 would allow for a recordable copy of the video signal or for distributing the video signal.

Thus, a copy protection (or content control) system and/or method for allowing copying or distribution of a copy protected signal (or content control) is disclosed. The above description is illustrative and not limiting; further modifications will be apparent to one of ordinary skill in the art in light of this disclosure.

What is claimed is:

1. A media system, comprising:
   an apparatus for playing media embodying a media signal, the apparatus including a first input for receiving a copy-disabled media signal in which a content control signal is included, wherein the copy-disabled media signal inhibits recording;
   a second input for receiving a control signal;
   a blanking component to generate a copy-enabled media signal by removing at least a portion of the content control signal included in the copy-disabled media signal, if the control signal is configured to enable removal of the content control signal; and
   an output for providing the copy-enabled media signal, wherein the copy-enabled media signal is recordable.

2. The system of claim 1, wherein the media signal is a video signal.

3. The system of claim 1, wherein the media signal is a data signal.

4. The system of claim 1, wherein the content control signal is an ACP waveform.

5. The system of claim 1, wherein the control signal corresponds to one or more blanking bits encoded into the media signal.

6. The system of claim 1, wherein the control signal corresponds to a control input received from an external source.

7. A media system, comprising:
   an apparatus for playing media embodying a media signal, the apparatus including a first input for receiving the media signal;
   a second input for receiving a content control signal;
   a third input for receiving a control signal;
   a modifier component to combine the media signal with the content control signal to produce a copy-disabled media signal, wherein the copy-disabled media signal inhibits recording;
   a blanking component coupled to the modifier component to generate a copy-enabled media signal by removing at least a portion of the content control signal of the copy-disabled media signal, if the control signal is configured to enable removal of the content control signal; and
   an output for providing the copy-enabled media signal, wherein the copy-enabled media signal is recordable.

8. The system of claim 7, wherein the media signal is a video signal.

9. The system of claim 7, wherein the media signal is a data signal.

10. The system of claim 7, wherein the content control signal is an ACP waveform.

11. The system of claim 7, wherein the control signal corresponds to one or more blanking or modification bits encoded into the media signal.

12. The system of claim 7, wherein the control signal corresponds to a control input received from an external source.

13. A method, comprising:
    receiving a copy-disabled media signal in which a content control signal is included, wherein the copy-disabled media signal inhibits recording, the copy-disabled media signal being received by an apparatus for playing media embodying a media signal;
    receiving a control signal;
    generating a copy-enabled media signal by removing at least a portion of the content control signal included in the copy-disabled media signal, if the control signal is configured to enable removal of the content control signal; and
    outputting the copy-enabled media signal, wherein the copy-enabled media signal is recordable.

14. The method of claim 13, wherein the media signal is a video signal.

15. The method of claim 13, wherein the media signal is a data signal.

16. The method of claim 13, wherein the content control signal is an ACP waveform.

17. The method of claim 13, wherein the control signal corresponds to one or more blanking bits encoded into the media signal.

18. The method of claim 13, wherein the control signal corresponds to a control input received from an external source.

19. A method, comprising:
    receiving a media signal, the media signal being received by an apparatus for playing media embodying the media signal;
    receiving a content control signal;
    receiving a control signal;
    combining the media signal with the content control signal to produce a copy-disabled media signal, wherein the copy-disabled media signal inhibits recording;
    generating a copy-enabled media signal by removing at least a portion of the content control signal of the copy-disabled media signal, if the control signal is configured to enable removal of the content control signal; and
    outputting the copy-enabled media signal, wherein the copy-enabled media signal is recordable.

20. The method of claim 19, wherein the media signal is a video signal.

21. The method of claim 19, wherein the media signal is a data signal.

22. The method of claim 19, wherein the content control signal is an ACP waveform.

23. The method of claim 19, wherein the control signal corresponds to one or more blanking bits encoded into the media signal.

24. The method of claim 19, wherein the control signal corresponds to a control input received from an external source.

25. The system of claim 1, wherein the blanking component is included in a the apparatus.

26. The system of claim 1, wherein blanking component is included in the apparatus.

27. The system of claim 7, wherein the blanking component is included in the apparatus.

28. The system of claim 7, wherein the blanking component is included in the apparatus.

29. An apparatus comprising:
   a player for playing media embodying a digital video signal;
   a first circuit for receiving the digital video signal;
   a second circuit to synthesize one or more copy protection signals;
   a digital to analog converter including an output terminal; and
   a third circuit to selectively pass the one or more copy protection signals to the output terminal of the digital to analog converter or to remove the one or more copy protection signals at the output terminal of the digital to analog converter, wherein upon removal of the one or more copy protection signals, a corresponding analog video signal is recordable.

30. The apparatus of claim 29, wherein the one or more copy protection signals including copy protection signals from the group: AGC waveform, pseudo sync pulses, and color burst modifications.

31. The apparatus of claim 29 wherein the media is a WiFi connection.

32. The apparatus of claim 29 wherein the media is a USB connection.

33. The apparatus of claim 29 wherein the media is a DVD.

34. The apparatus of claim 29 wherein the media is a hard disk drive.

35. The apparatus of claim 29 wherein the media is an Internet connection.

36. The apparatus of claim 29 wherein the media is a solid state memory storage device.

37. An apparatus comprising:
   a solid state memory device for storing video or data received from an external source;
   a player for playing video from the solid state memory device;
   a first circuit for reading the video or data from the solid state memory device;
   a second circuit to synthesize one or more copy protection signals;
   a digital to analog converter including an output terminal; and
   a third circuit to selectively pass the one or more copy protection signals to the output terminal of the digital to analog converter or to remove the one or more copy protection signals at the output terminal of the digital to analog converter, wherein upon removal of the one or more copy protection signals, a corresponding analog video signal is recordable.

38. The apparatus of claim 37, wherein the one or more copy protection signals including copy protection signals from the group: AGC waveform, pseudo sync pulses, and color burst modifications.

39. The apparatus of claim 37 wherein the external source is a USB connection.

40. The apparatus of claim 37 wherein the external source is a DVD player.

41. The apparatus of claim 37 wherein the external source is a hard disk drive.

42. The apparatus of claim 37 wherein the external source is an Internet connection.

43. The apparatus of claim 37 wherein the external source is a WiFi connection.

44. The system of claim 1, wherein the apparatus is one of the group: a set-top box, a DVD player, and a memory device.

45. The system of claim 1, wherein the content control signal includes a CGMS data signal.

46. The system of claim 7, wherein the apparatus is one of the group: a set-top box, a DVD player, and a memory device.

47. The system of claim 7, wherein the content control signal includes a CGMS data signal.

* * * * *